March 1, 1966     D. E. GUNCKEL     3,237,824

CONTAINER FOR AUTOMOBILE

Filed Nov. 12, 1964

INVENTOR
DANIEL E. GUNCKEL

Albert L. Jeffers
ATTORNEY

United States Patent Office 3,237,824
Patented Mar. 1, 1966

3,237,824
CONTAINER FOR AUTOMOBILE
Daniel E. Gunckel, 124 S. Cleveland St., Auburn, Ind.
Filed Nov. 12, 1964, Ser. No. 410,451
3 Claims. (Cl. 224—42.42)

This invention relates to an improved container adapted to be positioned on the hump or longitudinal raised portion in an automobile floor space which is commonly found in present day automobiles.

The tunnel-like ridge found in present day automobiles usually tapers toward the two front seats. One of the primary objects of this invention is to provide a container adapted to be mounted on top of the tunnel-like ridge so that the top portion is substantially level.

Another object of this invention is to provide a container adapted to be mounted on the tunnel-like ridge of an automobile which will provide extra storage space, and which is accessible by both the driver and passenger.

Still another object of this invention is to provide a container adapted to be supported upon the tunnel-like ridge of an automobile having a pair of slidable top members mounted on a U-shaped rail so that the inside of the container is accessible by sliding one top member over the other.

With these objects definitely in view, this invention resides in certain novel features of construction, combination and arrangement of elements and positions as will be hereinafter described in detail in the specification, particularly pointed out in the appended claims, and illustrated in the accompanying drawing which forms a material part of this specification, and in which:

Figure 5:
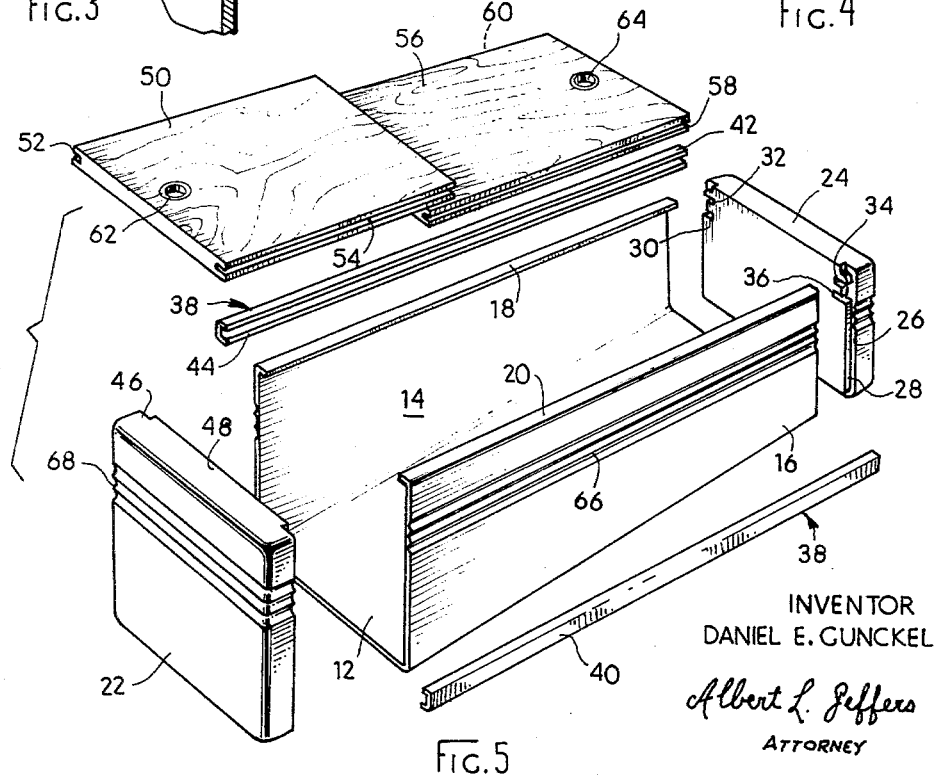
FIGURE 5 is a perspective exploded view illustrating the parts used in constructing my container.

Referring to the drawing, and more particularly to FIGURE 5, the reference numeral 12 designates a rectangular bottom wall of the container 10. The side walls 14 and 16 are longitudinally tapered to compensate for the taper or drop of the tunnel-like ridge toward the front seats of the automobile. The side walls 14 and 16 are provided with inturned flanges 18 and 20 forming a rectangular opening at each end of the container to receive the end members 22 and 24.

The end wall or member 24 is provided with a recess 26 forming a projection or shoulder 28 adapted to be received in one of the end openings formed by the bottom wall 12, side walls 14 and 16, and flanges 18 and 20. The end member 24 is provided with spaced recesses 30, 32, 34 and 36. The recesses are adapted to receive the end portion of a U-shaped rail 38 having a backing member 40, and side members 42 and 44. The end member or wall 22 is constructed substantially similar to the end member 24, having a recess 46 forming a shoulder 48 adapted to be received in the other end opening of the container. The end member 22 is slightly larger in size than the end member 24 to compensate for the longitudinal taper of the side walls. The end wall 22 is provided with spaced recesses corresponding to the recesses 30, 32, 34 and 36 for supporting the other end of the U-shaped rail 38.

Figure 2:
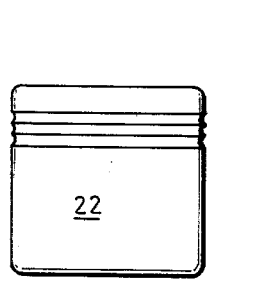
FIGURE 2 is an end view of the container illustrated in FIGURE 1.
Figure 1:
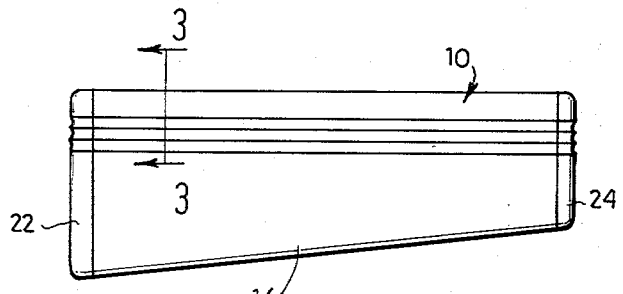
FIGURE 1 is a longitudinal view illustrating my container which is adapted to be mounted on a tunnel-like ridge portion of an automobile.
Figure 3:
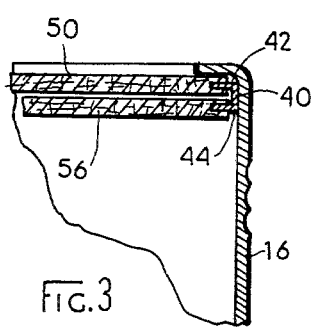
FIGURE 3 is a cross sectional view taken on line 3—3 in FIGURE 1.
Figure 4:
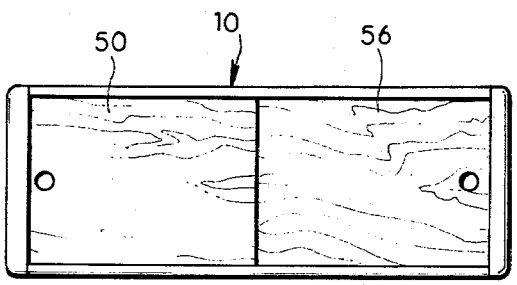
FIGURE 4 is a top plan view of the container shown in FIGURE 1.

The rectangular shaped top member 50 is provided with a recess 52 disposed in one longitudinal edge and a recess 54 disposed in the other longitudinal edge. The top member 56 is constructed substantially similar to the top member 50, having longitudinal recesses 58 and 60. The top members 50 and 56 are provided with finger indentations 62 and 64. The top member 50 is mounted on the member 42 of the U-shaped rail 38, and the top member 56 is mounted on the lower member 44 of the U-shaped rail 38 so that they are spaced from each other, as illustrated in FIGURE 3.

In operation, the container 10 is mounted on the tunnel-like ridge of an automobile and may be secured thereto by metal screws (not shown). The top members, or covers, 50 and 56 may be operated by either the driver or the passenger of the automobile by sliding the top members on the U-shaped rail 38. If desired, the container can be provided with ornamentation ridges 66 and 68.

Although the invention has been described herein the reference to specific embodiments, modifications and variations therein will readily occur to those skilled in the art. Accordingly, all such variations and modifications are included within the intended scope of the invention as defined by the folowing claims.

I claim:

1. A container for an automobile having a tunnel hump comprising, in combination:
    (a) a rectangular bottom wall adapted to be secured to the tunnel hump of an automobile,
    (b) said bottom wall having integral opposite side walls extending upwardly and each side wall having an inwardly turned flange forming an opening at each end of the container,
    (c) a first end wall having a recess around one edge forming a shoulder portion adapted to be received within one of the openings formed by said side walls and bottom wall,
    (d) a second end wall having a recess around one edge forming a shoulder portion adapted to be received within the other opening formed by said side walls and bottom wall,
    (e) a pair of U-shaped rails,
    (f) said first end wall provided with a pair of spaced recesses for receiving and supporting one end of said rails,
    (g) said second end wall provided with a pair of spaced recesses for receiving and supporting the other end of said rails,
    (h) a pair of rectangular top members provided with a recess disposed along each side, and
    (i) said rectangular top members adapted to be mounted on said U-shaped rails so that the top members can be moved on the rails to open and close the opening to the container.

2. A container adapted to be mounted in an automobile having a tunnel hump comprising, in combination:
    (a) a rectangular bottom wall adapted to be secured to the tunnel hump of an automobile,
    (b) said bottom wall having integral opposite side walls extending upwardly therefrom,
    (c) each side wall being tapered longitudinally so that the top of the container is level when said bottom wall is secured to the tunnel hump of an automobile,
    (d) a first end wall having a pair of spaced recesses,
    (e) a second end wall having a pair of spaced recesses, said second end wall being smaller than the first end wall,
    (f) a pair of U-shaped rails adapted to be supported by the spaced recesses in said end walls,
    (g) a pair of rectangular top members having a longitudinally disposed recess along each side, and (h) said rectangular top members adapted to be mounted on said U-shaped rails so that the top members can be moved on said rails to open and close the opening to the container.

3. A container for an automobile having a tunnel hump comprising, in combination:
   (a) said container having a rectangular bottom wall adapted to be secured to the tunnel hump of an automobile,
   (b) said container having opposite side walls tapered longitudinally so that the top of the container is level when said bottom wall is secured to the tunnel hump of an automobile,
   (c) a first end wall and a second end wall, said second end wall being smaller than the first end wall,
   (d) a pair of U-shaped rails,
   (e) said end walls having spaced recesses for receiving and supporting the ends of said rails,
   (f) a pair of rectangular top members having a longitudinally disposed recess along each side,
   (g) one of said top members being mounted on the upper portion of the U-shaped rails and the other top member being mounted on the lower portion of the U-shaped rails so that the top members can be moved on said rails to open and close the opening to the container.

References Cited by the Examiner
UNITED STATES PATENTS

| | | | |
|---|---|---|---|
| 2,047,937 | 7/1936 | Bohn et al. | 312—295 |
| 3,136,461 | 6/1964 | Gregg | 224—42.42 |

GERALD M. FORLENZA, *Primary Examiner.*

J. E. OLDS, *Assistant Examiner.*